No. 671,247. Patented Apr. 2, 1901.
A. E. SUPER.
MEDICINE SPOON.
(Application filed Jan. 28, 1901.)
(No Model.)
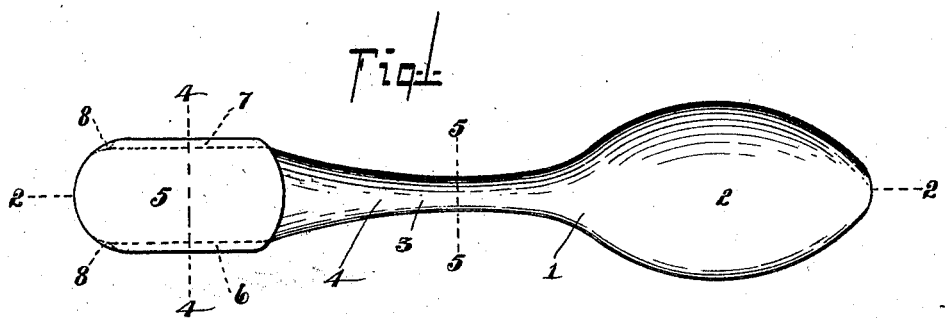
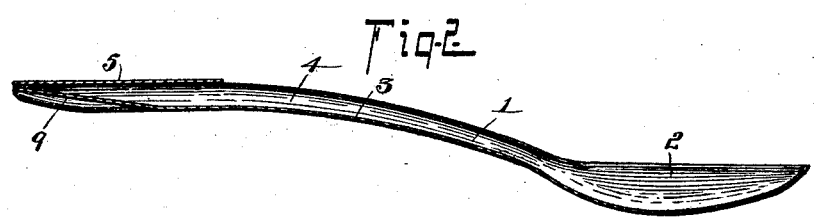
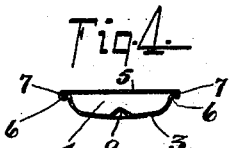 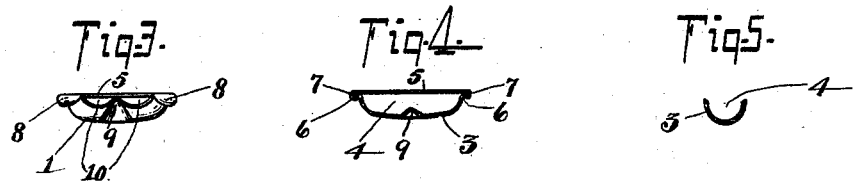 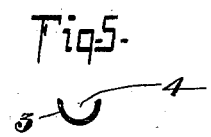
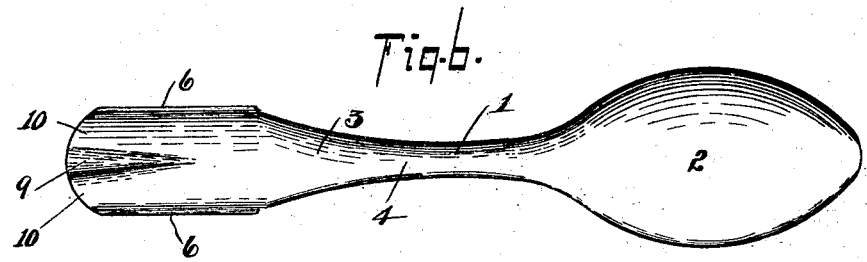
WITNESSES:
Walter C. Pusey.
A. V. Groupe
INVENTOR
Anna E. Super
BY
Joshua Pusey,
ATTORNEY

UNITED STATES PATENT OFFICE.

ANNA E. SUPER, OF NARBERTH, PENNSYLVANIA.

MEDICINE-SPOON.

SPECIFICATION forming part of Letters Patent No. 671,247, dated April 2, 1901.

Application filed January 28, 1901. Serial No. 45,030. (No model.)

*To all whom it may concern:*

Be it known that I, ANNA E. SUPER, a citizen of the United States, residing at Narberth, Montgomery county, State of Pennsylvania, have invented certain new and useful Improvements in Medicine-Spoons, of which the following is a full, clear, and exact description, reference being had to the accompanying drawings, of which—

Figure 1 is a plan view of my invention; Fig. 2, a section as on line 2 2, Fig. 1; Fig. 3, an end view taken from the outer end of the handle; Fig. 4, a section as on line 4 4, Fig. 1; Fig. 5, a similar section as on line 5 5, Fig. 1; Fig. 6, a plan view, the cap or cover of the outer end of the handle portion having been removed.

My invention relates to improvements in spoons or devices for use in administering medicine or the like to invalids or infants; and my object has been to provide such a spoon as shall be simple in construction and in manner of use and which may be readily and easily cleansed when desired.

To this end my invention consists of a spoon the upper side of the handle of which is provided with a longitudinal groove or channel extending the entire length thereof and communicating with the bowl of the spoon, the part of said groove adjacent to the outer end of the handle being provided with a cover, preferably detachable, as hereinafter described.

The invention further consists of certain details of construction hereinafter particularly pointed out.

Referring to the drawings, 1 is a spoon having the usual bowl 2 and handle 3. Extending longitudinally along the entire upper face of the handle and communicating with the bowl is a groove or channel 4. The part of this groove adjacent to the outer end of the handle is covered over by a plate 5, which I usually secure to the handle detachably, preferably as follows: I provide the lateral edges of that portion of the handle with longitudinal flanges 6, (seen more clearly in Fig. 4,) that are adapted to engage corresponding grooves 7 of the plate or cover 5, which I form by turning over the side edges of the latter, as also seen in Fig. 4. Thus the cover may be readily attached to and detached from the handle by sliding the former over and upon the flanges 6.

In order to prevent the sliding on of the cover too far, I provide a suitable stop—such, for example, as that clearly shown in Fig. 3—which is formed by bending down the outer ends of the side edges of the cover at 8. It is sometimes desirable to contract the exit of the channel 4. This I do by dividing that portion of the latter by means of a rib or partition 9, Figs. 3 and 4, into two channels or openings 10.

In using the spoon the medicine or other liquid is placed in the bowl and the part of the handle having the cover 5 is inserted in the mouth of the patient or other person. The spoon is then tilted upwardly to the required extent to cause the liquid to flow into and along the channel 4, and thence into the mouth of the person by way of the opening or openings 10. The said channel being uncovered between the bowl and cover 5, the quantity and flow of the liquid may be readily observed and nicely regulated by suitable manipulation of the spoon.

My improved spoon may be easily and cheaply made, as the main portion thereof may be struck up from a piece or sheet of metal, as also the cover. It will further be seen that when the latter is made detachable, as described, (as would preferably and usually be done,) it and the part of the handle that had been covered may be readily cleansed, which is an important factor.

Having thus described my invention, I claim as new and desire to secure by Letters Patent—

1. A spoon of the character recited having in its upper side a groove extending from the bowl to the outer extremity of the handle, and having a cover secured to the latter and extending over the part of said groove adjacent to the outer end of said handle, substantially as and for the purpose set forth.

2. The combination with a spoon of the character recited, having a groove extending from the bowl to the outer extremity of the handle, of a cover extending over part of said groove adjacent to the outer end of the handle, together with means for securing said cover detachably to said part of the handle, substantially as and for the purpose set forth.

3. The combination with a spoon, of the character recited, having a groove on its upper side extending from the bowl to the outer extremity of the handle, of a cover extending over the part of said groove adjacent to the outer end of said handle, and having the lateral grooves adapted to engage corresponding flanges of the handle, whereby said cover is adapted to be readily attached to and detached from said handle, substantially as specified.

In testimony whereof I have hereunto affixed my signature this 19th day of September, A. D. 1900.

ANNA E. SUPER.

Witnesses:
 WALTER C. PUSEY,
 JOSHUA PUSEY.